United States Patent [19]
Khuc et al.

[11] Patent Number: 5,828,740
[45] Date of Patent: Oct. 27, 1998

[54] PREPAID CALLING CARD EXTERNAL/ADJUNCT DATABASE PROCESSOR

[75] Inventors: Minh Duy Khuc, Overland Park, Kans.; Carl Milton Coppage, Harrisonville, Mo.

[73] Assignee: Sprint Communications Co., L.P., K. C., Mo.

[21] Appl. No.: 749,128

[22] Filed: Nov. 14, 1996

[51] Int. Cl.⁶ .......................... H04M 15/00; H04M 17/00
[52] U.S. Cl. ............................................ 379/144; 379/114
[58] Field of Search ..................................... 379/111, 113, 379/114, 118, 133, 144, 91, 112, 120, 134, 154, 245; 364/406; 455/405, 406, 407, 408, 409, 410

[56] References Cited

U.S. PATENT DOCUMENTS

| | | | |
|---|---|---|---|
| 4,439,636 | 3/1984 | Newkirk et al. | 379/144 |
| 5,163,086 | 11/1992 | Ahearn et al. | 379/144 |
| 5,226,073 | 7/1993 | Albal et al. | 379/144 |
| 5,287,403 | 2/1994 | Atkins et al. | 379/144 |
| 5,311,594 | 5/1994 | Penzias | 379/114 |
| 5,313,463 | 5/1994 | Gore et al. | 379/91.01 |
| 5,353,335 | 10/1994 | D'Urso et al. | 379/143 |
| 5,440,621 | 8/1995 | Castro | 379/144 |
| 5,481,600 | 1/1996 | Alesio | 379/114 |
| 5,485,510 | 1/1996 | Colbert | 379/145 |
| 5,487,107 | 1/1996 | Atkins et al. | 379/144 |
| 5,546,446 | 8/1996 | Tsunokawa et al. | 379/144 |
| 5,583,918 | 12/1996 | Nakagawa | 379/144 |
| 5,621,787 | 4/1997 | McKoy et al. | 379/144 |
| 5,655,007 | 8/1997 | McAllister | 379/91.01 |
| 5,661,781 | 8/1997 | Dejager | 379/144 |
| 5,675,607 | 10/1997 | Alesio et al. | 379/144 |

*Primary Examiner*—Curtis A. Kuntz
*Assistant Examiner*—Rexford N. Barnie
*Attorney, Agent, or Firm*—Harley R. Ball; Jed W. Caven

[57] ABSTRACT

In a telecommunications network, a network host call server determines whether a call placed using a prepaid calling card was issued by a vendor other than the telecommunications carrier and if so, queries a database associated with the issuing vendor for information representing the telecommunications services associated with the card.

2 Claims, 2 Drawing Sheets

5,828,740

PREPAID CALLING CARD EXTERNAL/ADJUNCT DATABASE PROCESSOR

BACKGROUND OF THE INVENTION

1. Field of the Invention

The present invention relates to the field of telecommunications. More particularly, the invention is concerned with prepaid calling cards in which a host call server in a telecommunications network determines whether a call placed using a prepaid calling card was issued by a vendor other than the telecommunications carrier and if so, queries a database associated with the issuing vendor for information representing the telecommunications services associated with the card and process a call accordingly.

2. Description of the Prior Art

In the prior art, prepaid calling cards are issued by a telecommunications carrier at a set price and allow the purchaser to use telecommunications services on a prepaid basis. These services typically include a predetermined number of minutes of long distance call services, usually within a defined geographical area but can also include many other services offered by the carrier such as voice mail and message forwarding.

To use a prepaid calling card, the caller dials an access number, typically a toll free number, associated with the card. The call is routed to a host call server that interacts with the caller who is prompted to enter a pin (personal identification number) code associated with the card. The server determines the available services for the card such as the minutes of long distance calling remaining and prompts the network to route the call to the destination as entered by the caller. This prior art configuration allows outside vendors to sponsor prepaid calling cards for promotional purposes, but has prevented outside vendors from actually issuing and managing their own prepaid calling cards and related services.

SUMMARY OF THE INVENTION

The present invention solves the prior art problems discussed above and provides a distinct advance in the state of the art. More particularly, the method hereof allows outside vendors to issue and manage prepaid calling cards and related services in cooperation with a telecommunications carrier.

In the preferred embodiment, a vendor wishing to issue prepaid calling cards issues each card with an associated access number and a code number such as a pin code in cooperation with a carrier operating a telecommunications network. The vendor maintains a database accessible by the network. This database stores information representative of the telecommunications services associated with the card as identified by the pin code.

In the preferred method, a host call server receives a call over the network placed to an access number associated with a prepaid calling card. The access number is one of a plurality of access numbers associated with a plurality of prepaid calling cards issued by vendors other than the carrier.

The server also receives a code number associated with the card and using at least one of the access number and code number determines whether the card was issued by one of the vendors. If yes, the server sends a query to the vendor database for information representative of the network services associated with the card. Upon receipt of the information from the vendor database, the server enables the network to provide the services represented by the information. At the end of the call, the server sends an update message to the vendor database indicating the services used for handling the call.

DETAILED DESCRIPTION OF THE PREFERRED EMBODIMENT

Figure 1:
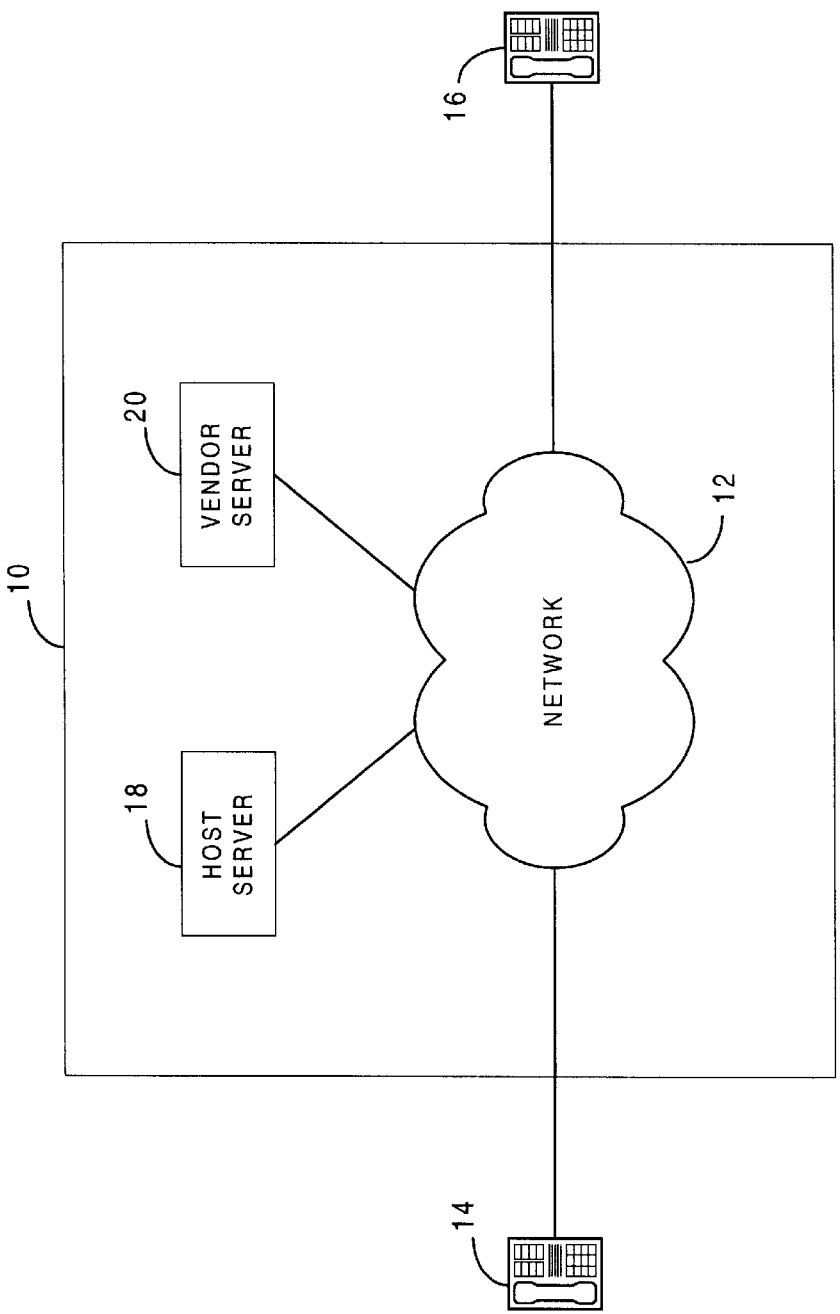
FIG. 1 is a block diagram representing a telecommunications system operable for providing telecommunications services associated with a prepaid calling card.

FIG. 1 illustrates telecommunications system 10 for implementing the preferred embodiment of the present invention. System 10 includes telecommunications network 12 operable for handling calls between a plurality of stations such as calling station 14 and destination station 16. System 10 also includes host call server 18 and vendor database servers 20, which are further illustrated in FIG. 2.

As will be appreciated, calling stations 14, 16 can include various types of stations operable for originating or terminating telecommunications such as telephones, computer modems, telefacsimile machines, private branch exchanges (PBX's) and so forth including servers 18 and 20. Network 12 can include a local exchange carrier (LEC), an interexchange carrier (IXC) a combination LEC/IXC, or other telecommunications networks with similar capabilities for handling telecommunications traffic between calling stations.

Host call server 18 includes enhanced services platform 22, such as a TANDEM host computer operable for handling prepaid calling cards, coupled with data storage 24 such as a TANDEM nonstop database and coupled with a plurality of conventional voice responsive units (VRU's) 26 operable for issuing voice prompts to callers and processing caller responses such as DTMF tones.

Server 18 is also connected to conventional internal systems computer 28 such as a TANDEM computer supporting TCP/IP coupled with service data storage 30 and other conventional processors 32 for handling such functions as provisioning, billing, and management for prepaid calling cards.

Figure 2:
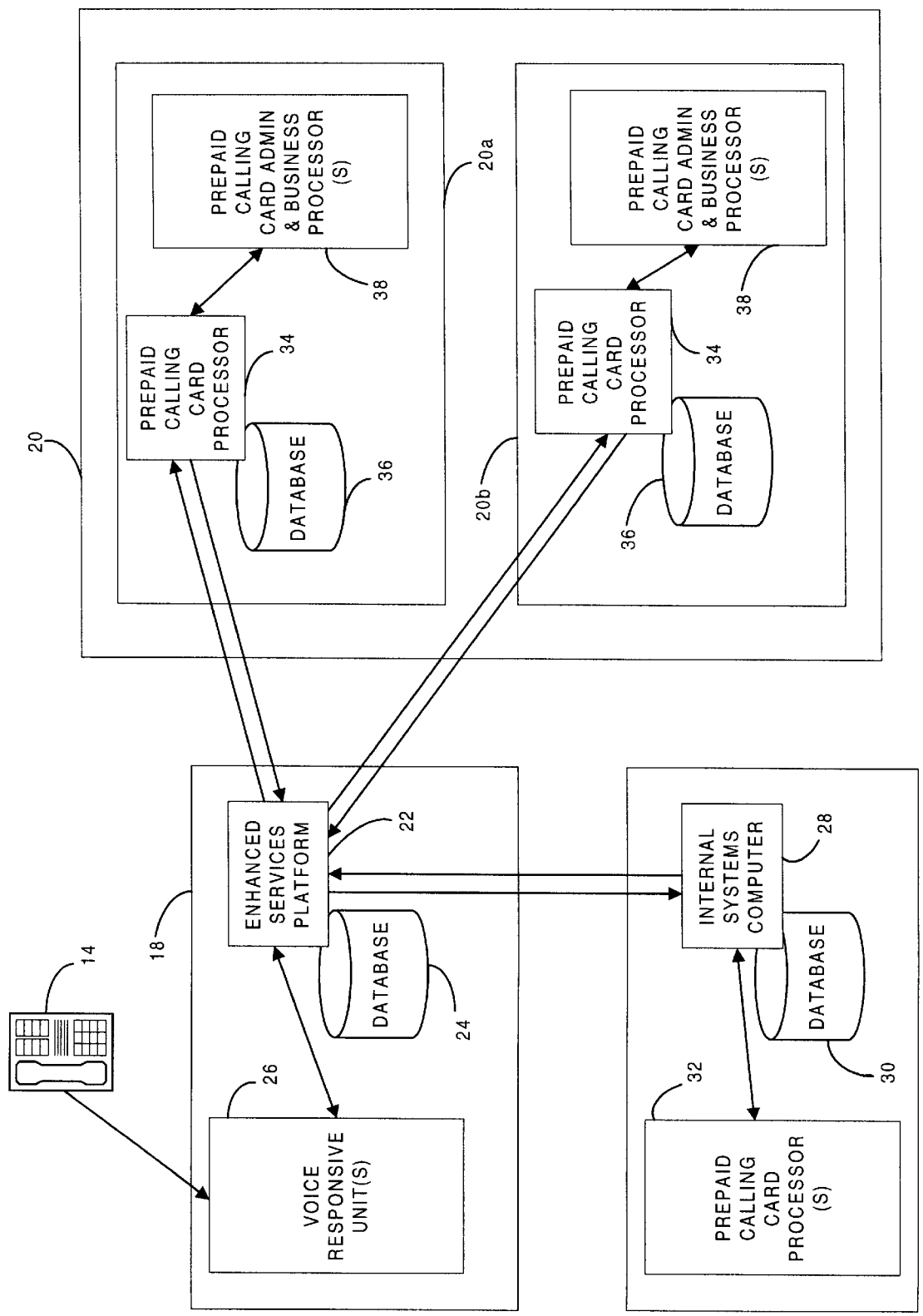
FIG. 2 is a block diagram representative of the host call server and vendor database server of FIG. 1.

FIG. 2 also illustrates a plurality of vendor database servers 20 represented by servers 20a and 20b. In the preferred embodiment, servers 20a,b generally perform the same functions for the respective vendors as does systems processor 28 for the carrier of network 12 and accordingly, preferably include similar equipment or the equivalent. It is also preferred that vendor servers 20a, 20b support TCP/IP and are equipped for data communication with platform 22 preferably by way of network 12. It will be appreciated, however, such data communication can also occur by way of a wide area network (WAN), local area network (LAN) or other means capable of transporting data communications.

Each vendor database server 20a,b includes computer 34 coupled with vendor data storage 36 and also coupled with additional processors 38 as needed for performing such functions as provisioning, billing and management in order to handle the administrative tasks for prepaid calling cards in a manner similar to that of processors 32.

As a preliminary to operation, the carrier of network 12 assigns one or more access numbers, preferably toll free numbers, for use by one or more outside vendors when issuing prepaid calling cards. Additionally, each vendor is assigned a set of code numbers, preferably a sequence of pin codes, for use in uniquely identifying each prepaid calling card issued by the vendor. Preferably each pin code consists of eight digits with the first four digits corresponding to a particular vendor.

Each vendor stores its pin code information as part of a vendor database in vendor data storage 36. The pin code information is stored in association with the telecommunications services authorized for the prepaid calling card identified by the pin code.

The carrier stores three databases in storage 24. The first is a carrier access number database of those access numbers associated with prepaid calling cards issued by the carrier. The second database is a carrier pin code database listing the pin codes of the cards issued by the carrier stored in association with the telecommunications services for each card. The third database is a vendor pin code database storing the first four digits of the pin codes assigned to the vendors. Additionally, vendor information is stored in association with each pin code identifying the issuing vendor and the information needed to establish data communications with that vendor's server. This information might include, for example, the vendor server telephone number or network address, communications format, access codes and so forth.

In operation, a caller using a prepaid calling card places a call from calling station 14 by dialing the associated access number, usually a toll free number printed on the card. Network 12 translates the dialed number into a destination number which, in this case, is host call server 18. As part of this process, network 12 forwards the dialed number to server 18 using DNIS (Dialed Number Identification System). The preferred access number received by host server 18 is the dialed toll free number as translated by the network, but could be the actual number as dialed in some circumstances. This might occur, for example, if the access number is not a toll free number or if it is a local number.

Server 18 answers the call and routes the call to an available voice response unit 26. VRU 26 interacts with the caller by issuing voice prompts and by responding to DTMF tones entered by the caller. In particular, VRU 26 prompts the caller to enter the pin code associated with the prepaid calling card.

In response to receipt of the dialed number through DNIS, platform 22 queries the carrier access number database to determine whether the dialed number is in this database. If yes, this indicates that the card is one issued by the carrier. Platform 22 then uses the pin code entered by the caller to query the carrier pin code database which responds by returning information representative of the telecommunications services associated with the card. As an example, these services might include domestic long distance service for twenty minutes. Other examples include wireless, voice mail and message forwarding.

Platform 22 then signals VRU 26 to prompt the caller for the desired telecommunications service associated with the card which might be a destination telephone number such as that of destination station 16 (FIG. 1). Upon entry of the destination number, server 18 signals network 12 to complete the call to destination station 16.

Upon termination of the call, host server 18 updates the various records, as is conventional with prepaid calling cards. This update might include, for example, subtracting the time duration of the call from the original 20 minutes to provide an updated record of calling minutes remaining for the card. As will be appreciated, host server 18 prevents the call duration from exceeding the allowed time.

If the dialed number is not present in the carrier access number database, this indicates that the associated card was issued by an outside vendor. In response, server 18 queries the vendor pin code database using the first four digits of the pin code as a pointer. In response, this database returns the identity of the outside vendor and the information needed to establish data communications therewith.

If the identified vendor is vendor 1 as shown in FIG. 2, for example, host server 18 establishes communication with vendor database server 20a by communicating with vendor processor 32. As part of the data communication, host server 18 forwards the caller's pin code as part of a query for information representative of the telecommunications services associated with the prepaid calling card.

In response, vendor server 20a accesses its vendor pin code database for information representative of the telecommunications services associated with the card and returns this information to host server 18. Processing of the call is then handled conventionally as described above in connection with a card issued by the carrier. Upon completion of the call, host server 18 composes an update message and forwards this message to vendor server 20a, which responds by updating its records. From the above description, those skilled in the art will appreciate that the present invention allows virtually any vendor having the appropriate server to issue its own prepaid calling cards, in cooperative agreement with a carrier of telecommunications services.

Those skilled in the art will also appreciate that the present invention encompasses many variations in the preferred embodiment described above. Having described the preferred embodiment of the present invention, the following is claimed as new and desired to be secured by Letters Patent:

1. A method for providing a pre-paid calling card service for a host and for a plurality of other prepaid card vendors, wherein the host and the other prepaid card vendors each have associated pre-paid cards, the method comprising:

(a) receiving a call from a telecommunications network into a host call server, wherein the call is placed with an access number, wherein the call is associated with one of the prepaid cards, and wherein the one prepaid card is associated with a code number;

(b) receiving the access number and the code number from the telecommunications network into the host call server;

(c) in the host call server, using the access number to determine if the one pre-paid card is associated with the host or with the other prepaid card vendors;

(d) if the pre-paid card is associated with the host, then providing the prepaid calling card service from the host call server; and (e) if the pre-paid card is associated with the other prepaid card vendors, then performing steps (f)–(j);

(f) in the host call server, using the code number to determine one of the other prepaid card vendors that is associated with the pre-paid card;

(g) sending a message to the one of the other prepaid card vendors;

(h) receiving a response from the one of the other prepaid card vendors that indicates available services for the one pre-paid card;

(i) providing the prepaid calling card service from the host system based on the response; and (j) sending another message to the one of the other prepaid card vendors that indicates services used on the call.

2. The method of claim 1 where the host comprises a portion of the telecommunications network and wherein the method further comprises routing the call through the telecommunications network to the host call server and routing the call through the telecommunications network from the host call server toward a destination.

* * * * *